UNITED STATES PATENT OFFICE.

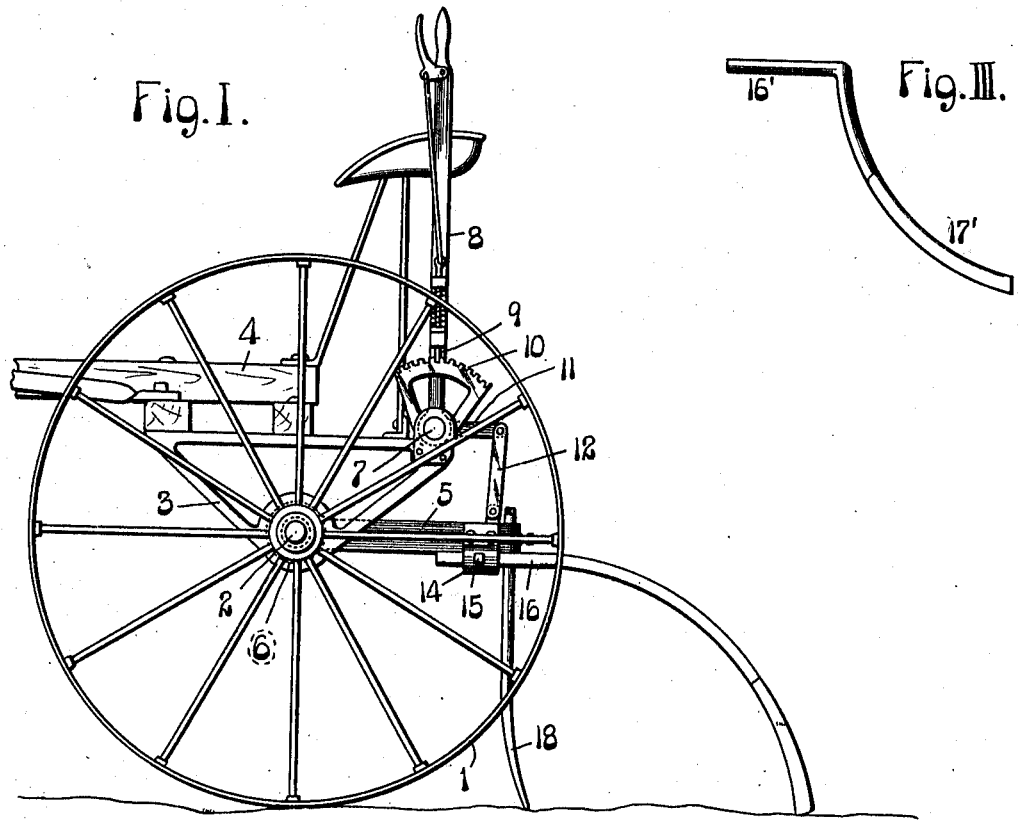
Fig. I.
Fig. III.
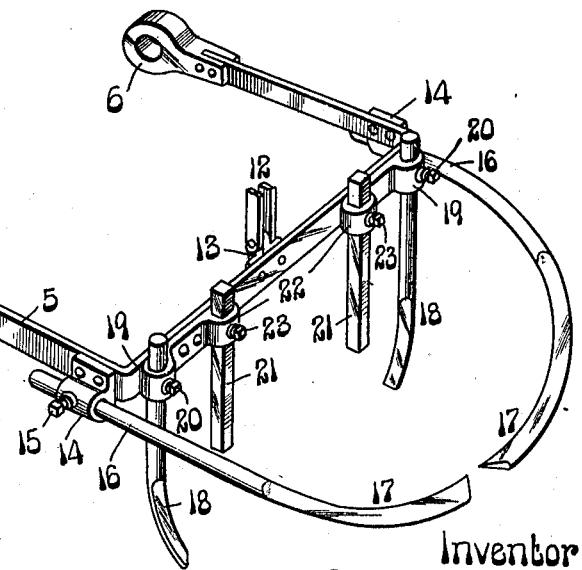
Fig. II.
Attest
O. J. McCauley
E. B. ——
Inventor:
O. J. Springer
by —— Att'y.

OTTO J. SPRINGER, OF EDWARDSVILLE, ILLINOIS.

SUBSOIL-CULTIVATOR.

970,760.

Specification of Letters Patent. Patented Sept. 20, 1910.

Application filed April 28, 1910. Serial No. 558,256.

*To all whom it may concern:*

Be it known that I, OTTO J. SPRINGER, a citizen of the United States of America, residing in Edwardsville, in the county of Madison and State of Illinois, have invented certain new and useful Improvements in Subsoil-Cultivators, of which the following is a full, clear, and exact description, reference being had to the accompanying drawings, forming part of this specification.

My invention relates to a sub-soil cultivator, and has for its object the production of a strong and simple implement of this character having a wide range of adjustment, and which will effectively cut into and loosen the soil at the most desirable points beneath and at the sides of rows of plants being cultivated in the use of my implement.

Figure I is a side elevation of a sub-soil cultivator constructed in accordance with my invention. Fig. II is a perspective view of the soil working members and their carrier. Fig. III is a view of a modified form of claw.

In the accompanying drawings: 1 designates the ground wheels of my cultivator, which support an axle 2 that in turn supports a main frame 3 to which a draft tongue 4 is attached. These members comprise the running gear of my sub-soil cultivator.

5 designates a carrier to which the soil working devices of my cultivator are attached. This carrier is of U-shape, and its arms are provided at their forward ends with eyes 6 that are loosely fitted to the axle 2, in order that the carrier may be lowered and raised to properly position the soil working devices to the ground and cause them to enter thereinto as will hereinafter more fully appear.

7 is a rock shaft rotatably supported in suitable bearings carried by the main frame of the cultivator, and which is supplied with a hand lever 8, provided with a suitable latch 9 that bridges a rack segment 10 carried by the main frame. The rock shaft 7 is provided with an arm 11 that extends rearwardly therefrom, and is connected to the upper end of a supporting link 12 attached at its lower end to an ear 13, attached to the carrier 5 at the center of its rear and transverse portions. It will be readily understood that the members provided for the support of the carrier 5, and which have just been described, permit of the carrier being lowered and raised upon the operation of the hand lever 8.

The carrier 5 is provided at its sides with socket members 14, parallel therewith in which set screws 15 are mounted.

16 are claws adjustably mounted in the socket members 14 and extending rearwardly and downwardly from the carrier 5. The forward ends of these claws are straight, while the rear portions of the claws are curved downwardly and then laterally so that they terminate in soil working members 17, which extend toward each other, as seen in Fig. II, at a point sufficiently beneath the carrier 5 to provide for the soil working portions of the claws entering to a considerable distance into the soil when the carrier is lowered from the position in which it is seen in Fig. I. The soil working portions of the claws are preferably provided with cutting edges, as clearly seen in Fig. II, in order that they may enter more readily into, and pass through, the soil in which they are to operate. It will be obvious that the claws may be so adjusted in the ears 14 in which they are mounted, and by which they are connected to the carrier 5, to place the ends of their soil working portions in close proximity to each other, or to separate them more or less widely; and further, that by such adjustment, the soil working portions may be so disposed that they will cut to a greater or less degree into the soil according to the degree of angularity of these soil working portions relative to the surface of the soil in which they are to operate.

18 designates teeth located at the back of the carrier 5 and adjustably secured thereto through the medium of outer vertical sockets 19 in which the teeth are adjustably held by set screws 20. These teeth are preferably flattened at their lower ends, in order that they may enter into the soil more readily, and they are adapted to extend down into the soil during the operation of the cultivator in perpendicular lines to work therein for the purpose of loosening the soil in advance of the travel therethrough of the soil working portions of the claws 16. These teeth being adjustably attached to the carrier 5, they may be lowered or raised to any desired degree, in order that they will operate in the soil to the best advantage.

21 are supplemental vertical teeth carried by the carrier 5 and located between the teeth 18 and the center of the rear portion of the carrier. These teeth are mounted in inner vertical sockets 22 at the rear of the carrier, and are adjustably held in said ears by set screws 23.

In the practical use of my sub-soil cultivator, the claws 16 enter into the soil to such degree as to provide for their soil working portions extending either beneath the roots of the plants being cultivated; or, in cultivating such plants as have short roots, the ends of the soil working portions of the claws may be arranged in close proximity so that the soil will be loosened beneath all of the roots, while in cultivating other plants having longer roots, the working portions of the claws may be more widely separated to prevent injury to the longer roots of the plants. At the same time that the working portions of the claws are operating beneath the roots of the plants, the teeth 18 operate in the soil to loosen it in lines intersected by the paths in which the working portions of the claws operate, thereby thoroughly stirring up the soil by the passage of the two differently presented soil working devices through the soil. The teeth 21 operate in the soil close to the plants, but do not extend to as great a depth as the other soil working devices, their utility being that of stirring up the soil at the surface only and in near proximity to the plants without injury to the plant roots, such as would occur if these teeth were of greater length.

In Fig. III, I have shown a modification of the soil working claws used in my subsoil cultivator. In this modification, 16' is the forward portion of the claw; and the claw is bent rearwardly at an angle from this forward portion, terminating in a soil working portion 17', which extends rearwardly only, as distinguished from the soil working portions of the claws 16 that extend rearwardly and then forwardly.

I claim:

1. In a sub-soil cultivator, the combination of a running gear, a carrier pivotally supported by said running gear, soil working claws having straight forward ends rotatably fitted to said carrier, means for holding said claws from rotation, the claws having rear portions curved downwardly and provided with lateral extensions having front cutting edges.

2. A sub-soil cultivator comprising an axle, a carrier loosely fitted to said axle at its forward ends, means for raising and lowering the carrier, socket members parallel with the arms of the carrier and secured thereto, claws having straight forward ends rotatably mounted in the socket members and rear portions curved downwardly, and means for holding said claws from rotation in said socket members.

3. A sub soil cultivator comprising a U-shaped carrier having arms provided with axle eyes at their forward ends, means for raising and lowering the carrier, socket members parallel with the arms of the carrier and secured thereto, set screws in the socket members and claws having straight forward ends rotatably mounted in the socket members and secured by the set screws, and rear portions curved downwardly.

4. A sub soil cultivator comprising a U-shaped carrier having arms provided with axle-eyes at their forward ends, means for raising and lowering the carrier, socket members parallel with the arms of the carrier and secured thereto, set screws in the socket members and claws having straight forward ends rotatably mounted in the socket members and secured by the set screws, and rear portions curved downwardly and provided with lateral portions having cutting edges.

5. A sub soil cultivator comprising a U-shaped carrier having arms provided with axle-eyes at their forward ends, means for raising and lowering the carrier, socket members parallel with the arms of the carrier and secured thereto, set screws in the socket members, claws having straight forward ends rotatably mounted in the socket members and secured by the set screws, and rear portions curved downwardly, the vertical sockets on the back of the carrier, adjacent to the socket members, and teeth adjustably secured in the vertical sockets.

6. A sub soil cultivator comprising a U-shaped carrier having arms provided with axle-eyes at their forward ends, means for raising and lowering the carrier, socket members parallel with the arms of the carrier and secured thereto, set screws in the socket members, claws having straight forward ends rotatably mounted in the socket members and secured by the set screws, and rear portions curved downwardly, the vertical sockets on the back of the carrier and the supplemental vertical teeth adjustable in the vertical sockets.

7. A sub soil cultivator comprising a U-shaped carrier having arms provided with axle-eyes at their forward ends, means for raising and lowering the carrier, socket members parallel with the arms of the carrier and secured thereto, set screws in the socket members, claws having straight forward ends rotatably mounted in the socket members and secured by the set screws, and rear portions curved downwardly, the outer vertical sockets on the back of the carrier, teeth adjustably secured in the outer vertical sockets, and the inner vertical sockets on the back of the carrier and vertical teeth adjustably secured in the inner vertical sockets.

8. In a sub-soil cultivator, the combination of a running gear, a carrier pivotally connected to said running gear, claws adjustably connected to said carrier at its sides, and extending rearwardly and downwardly therefrom, each claw terminating in a lateral soil working portion, and teeth adjustably connected to the rear portion of said carrier and extending vertically therefrom.

9. In a sub-soil cultivator, the combination of a running gear, a carrier pivotally connected to said running gear, claws adjustably connected to said carrier at its sides and extending rearwardly and downwardly therefrom, each claw terminating in a lateral soil working portion, and teeth adjustably secured to the back of said carrier near its sides so that they will cut into the soil in a line bisected by the cut performed by said claws.

10. In a sub-soil cultivator, the combination of a running gear, a carrier pivotally connected to said running gear, claws adjustably connected to said carrier at its sides and extending rearwardly and downwardly therefrom, each claw terminating in a lateral soil working portion, teeth adjustably secured to the back of said carrier near its sides so that they will cut into the soil in a line bisected by the cut performed by said claws, and supplemental teeth adjustably secured to the back of the carrier between its center and the first mentioned teeth.

OTTO J. SPRINGER.

In the presence of—
EDWARD C. SPRINGER,
FREDERICK SPRINGER.